United States Patent [19]

Wagner

[11] Patent Number: 4,872,327

[45] Date of Patent: * Oct. 10, 1989

[54] LOCKING DEVICE FOR A VALVE

[76] Inventor: Thomas Wagner, Route 8 Box 289, Clarksville, Tenn. 37043

[*] Notice: The portion of the term of this patent subsequent to Jul. 4, 2006 has been disclaimed.

[21] Appl. No.: 133,636

[22] Filed: Dec. 16, 1987

[51] Int. Cl.⁴ .......................................... G05G 5/00
[52] U.S. Cl. .......................................... 70/175; 70/54; 70/178; 70/180; 70/232; 137/385
[58] Field of Search ................. 70/175–180, 70/52–56, 164, 232, 417; 137/385

[56] References Cited

U.S. PATENT DOCUMENTS

| | | |
|---|---|---|
| 566,932 | 9/1896 | Patrick . |
| 748,720 | 1/1904 | Glazier ................................. 70/178 |
| 1,251,591 | 1/1918 | Stoddart ............................... 70/178 |
| 1,690,461 | 11/1928 | Sieben .............................. 70/178 X |
| 1,780,994 | 11/1930 | Caldwell . |
| 2,716,882 | 9/1955 | Gill ........................................ 70/159 |
| 2,924,960 | 2/1960 | Palazzo . |
| 2,983,133 | 5/1961 | Hruby .................................. 70/232 |
| 3,004,421 | 10/1961 | Bowler ................................ 70/232 |
| 3,009,483 | 11/1961 | Salustri ............................ 70/158 X |
| 3,156,256 | 11/1964 | Weaver . |
| 3,172,282 | 3/1965 | Heckrotte ....................... 70/232 X |
| 3,269,159 | 8/1966 | Young .................................. 70/232 |
| 3,406,708 | 10/1968 | Maydock ............................ 137/385 |
| 3,559,429 | 2/1971 | Hermann ............................. 70/53 |
| 3,636,742 | 1/1972 | Raney ................................. 70/63 X |
| 4,162,690 | 7/1979 | Anderson . |
| 4,208,893 | 6/1980 | Avrich et al. ....................... 70/178 |
| 4,294,090 | 10/1981 | Metzger ............................. 70/53 X |
| 4,300,373 | 11/1981 | Camos et al. ................... 70/178 X |
| 4,405,161 | 9/1983 | Young et al. ................... 70/232 X |
| 4,407,146 | 10/1983 | Nielsen, Jr. ......................... 70/232 |
| 4,418,551 | 12/1983 | Kochackis ....................... 70/54 X |
| 4,422,314 | 12/1983 | Cooper .......................... 70/178 X |
| 4,506,528 | 3/1985 | Eberly .............................. 70/54 X |
| 4,538,434 | 9/1985 | Janzen et al. ....................... 70/178 |
| 4,541,256 | 9/1985 | Green ................................ 70/232 |
| 4,571,966 | 2/1986 | Lopez, Jr. ............................ 70/232 |
| 4,603,829 | 8/1986 | Koike et al. ...................... 70/58 X |
| 4,614,203 | 9/1986 | Russo ................................. 137/385 |
| 4,630,456 | 12/1986 | Nielsen, Jr. ..................... 70/178 X |
| 4,662,196 | 5/1987 | Michon ........................... 70/232 X |
| 4,699,168 | 10/1987 | Hauffe .............................. 137/385 |
| 4,781,043 | 11/1988 | Loeffler .............................. 70/54 |

FOREIGN PATENT DOCUMENTS 2608807 9/1977 Fed. Rep. of Germany ......... 70/58

Primary Examiner—Gary L. Smith
Assistant Examiner—Suzanne L. Dino
Attorney, Agent, or Firm—Stephen T. Belsheim

[57] ABSTRACT

A locking device for a valve to be used in conjunction with a lock having a hasp comprising a pair of detachably connected corresponding members that when assembled engage the flow valve to substantially prevent its movement. The members include a means to restrain relative twisting of the members, and a means for joining the members together with the lock wherein the hasp is sandwiched between said members.

7 Claims, 2 Drawing Sheets

LOCKING DEVICE FOR A VALVE

BACKGROUND OF THE INVENTION

The invention pertains to a locking device for a valve, and in particular, locking device for a shut-off valve on a fluid meter yoke that protects the shut-off valve and the hasp of a lock used in conjunction with the locking device from damage, vandalism and the like.

A public utility company, such as a gas or a water company, uses a meter to determine customer usage. If a customer is delinquent in paying the bill, the utility may terminate service and remove the meter thereby preventing the lawful use of the utility services.

Some customers will resort to unlawful means to gain access to utility service. One common way has been to defeat any locks that have heretofore been used to prevent usage. Past locks have been particularly subject to defeat as exemplified by the patents discussed below.

The patent art has disclosed locking devices for valves and the like. For example, U.S. Pat. No. 566,932 to Patrick is directed to stop-cock lock which is stated to be simple and durable in construction and easily applied or removed. The Patrick device consists principally of a slotted hasp adapted to be passed around the stop-cock and engage with its slot the turn-key of the cock. The free ends of the hasp are adapted to be locked together. One major drawback of the structure depicted in the Patrick patent is that the hasp of the lock is exposed. In other words, one who wants to defeat the lock has direct effective access with a saw blade or the like to the hasp so as to be able to saw the hasp in two thereby defeating the lock and gaining access to the valve.

Another example from the patent art is U.S. Pat. No. 1,780,994 to Caldwell. Caldwell is directed to a device for sealing or locking valves or cocks by providing a box-shaped member arranged to snuggly fit two opposite sides and the base of a valve or cock and includes two hinged lids arranged to fold down upon and interlock with the projecting stem or key of the valve or cock. The structure depicted in the Caldwell patent suffers the same drawback as Patrick in that the hasp of the lock is directly accessible by a saw blade or the like whereby the hasp can be sawed in two and the lock defeated. By defeating the lock, one gains access to the valve.

Still another example from the patent art is U.S. Pat. No. 2,924,960 to Palazzo which is directed to a lock engageable with a valve stem so as to prevent operation of the valve by unauthorized individual. Again, the device depicted in the Palazzo patent shows that one can have effective direct access by a saw blade to the hasp of the lock thereby permitting one to saw the hasp in two and defeat the lock.

U.S. Pat. No. 3,156,256 to Weaver is directed to a detachable valve locking means for valves of gas, water, or like pipes wherein it is desirable to maintain the valve in either an open or closed condition against unauthorized actuation. It is apparent that the device depicted in Weaver does not prevent effective direct access by a saw blade to the hasp of the lock. It seems the device depicted in Weaver can be defeated.

U.S. Pat. No. 4,162,690 to Anderson is directed to a locking device which includes a handle assembly and locking member which cooperate with an abutment member mounted on a valve housing to secure a valve in either an open or closed position. The device depicted in the Anderson patent does not effectively prevent direct access to the hasp by a saw blade, and thus, the structure is accessible to defeat by sawing the hasp in two.

Therefore, it becomes readily apparent that there is need for a locking device for shut-off valve, meter or the like that provides protection to both the shut-off valve and the hasp of a lock used in conjunction therewith. By providing a locking device offering such protection, the integrity of the locking device is increased. This results in a decrease of unauthorized use of utility services.

SUMMARY OF THE INVENTION

It is the principal object of the invention to provide an improved locking device for a valve.

It is a further object of the invention to provide an improved locking device for a valve that operates in conjunction with a separate lock.

It is another object of the invention to provide an improved locking device for a valve operating in conjunction with a separate lock whereby the locking device provides protection to the valve and the lock so that access cannot be gained to the valve by defeating the lock.

Finally, it is another object of the invention to provide an improved locking device for a valve for use in conjunction with a separate lock whereby the locking device prevents direct manipulation of the valve.

In one form thereof, the invention is a locking device for a valve to be used in conjunction with a lock having a hasp. The locking device includes a pair of detachable connected corresponding plates each having a shoulder that when in the connected condition substantially prevents the movement of the valve. One of said plates includes an arm passing through a corresponding aperture through which the hasp of a lock passes whereby the entire hasp is sandwiched between said plates.

In another form thereof the invention is a locking device for a valve to be used in conjunction with a lock having a hasp. The locking device comprises a pair of detachable connected corresponding members that when in a connected condition engage the valve to substantially prevent its movement, the corresponding members include means for restraining relative twisting of the corresponding members. The corresponding members further include means for joining the members together with a lock wherein the hasp of the lock is sandwiched between the members.

In another form thereof, the invention is a locking device for a valve comprising one elongate plate having top and bottom ends, an ear near the top end and projecting interiorly from said one plate, an arm near the bottom end and projecting interiorly from said one plate, and said one plate having a top edge with an interior corner containing a bevel. The device further includes another elongate plate having top and bottom ends, an ear near the top end projecting interiorly from said other plate, an aperture contained in said other plate near the bottom end thereof, said other plate having a top edge with an interior corner containing a bevel. When the locking device is in an assembled condition, said ears overlap and said arm passes through said aperture.

Each of said ears containing an aperture.

A lock having a hasp wherein said hasp passes through the apertures in said ears. The bevels accommodate the body of the lock so that the entire hasp is contained within the volume defined by said plates.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings.

FIG. 3 is a perspective view of the interior face of one of the plate members of the specific embodiment of FIG. 1.

DETAILED DESCRIPTION OF A SPECIFIC EMBODIMENT

Figure 1:
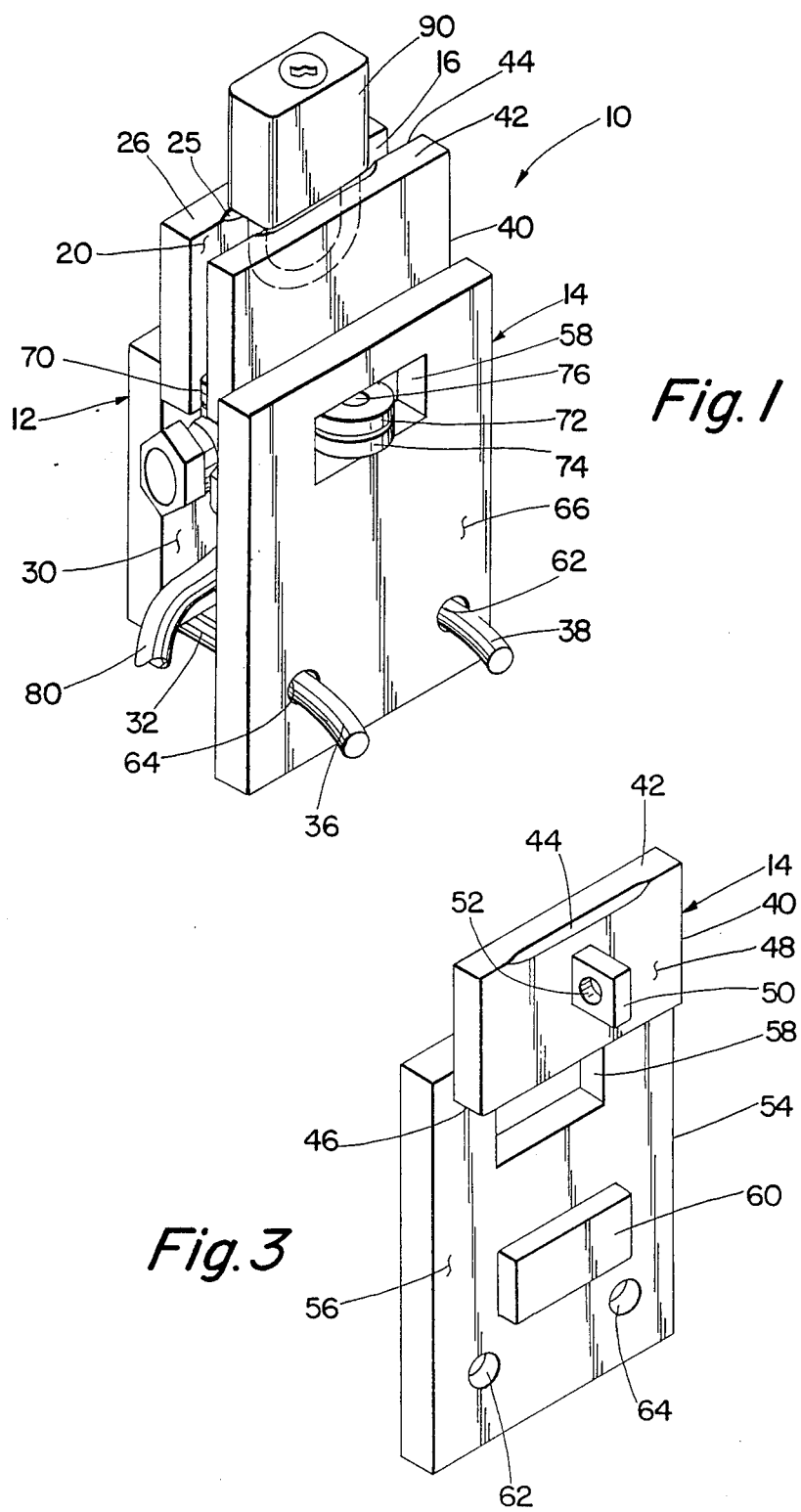
FIG. 1 is a perspective view of a specific embodiment of the invention wherein the locking device is connected to a shut-off valve on a meter yoke.
Figure 2:
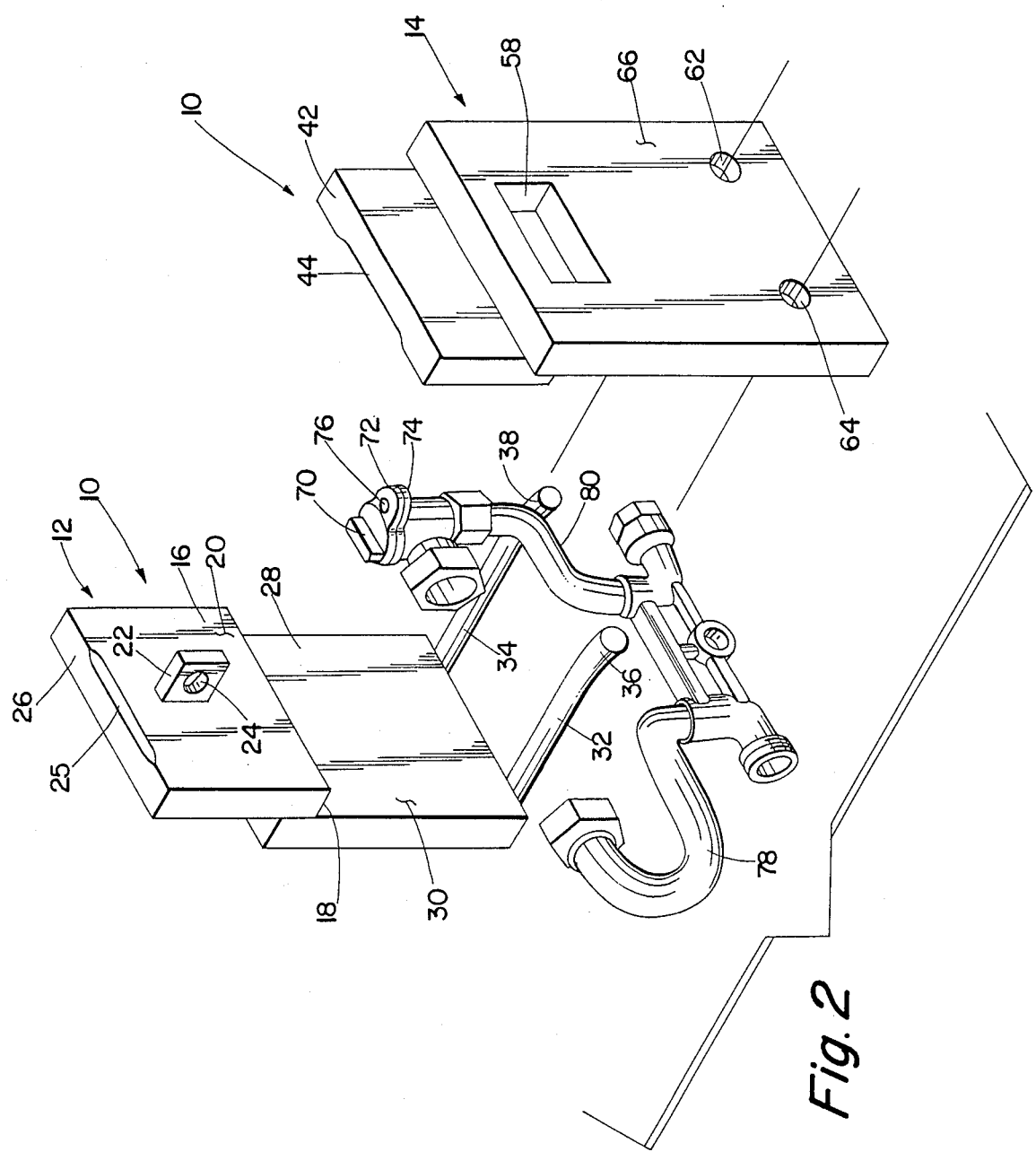
FIG. 2 is an exploded perspective view of the locking device of FIG. 1 without the padlock being illustrated.

Referring to the drawings, a specific embodiment of the locking device is generally designated as 10. Locking device 10 includes a pair of detachably connected corresponding plates (or members) 12 and 14. These plates 12,14 can be made from hardened steel so as to be resistant to sawing or cutting.

One plate 12 includes an upper member 16 having a bottom edge 18 and an interior surface 20. An ear 22, containing an aperture 24 projects inwardly from one plate 12. Upper member 16 further includes a top edge 26 wherein the interior corner thereof contains a bevel 25.

One plate 12 further includes a lower member 28 having an interior surface 30 a pair of arms, 32 and 34 extending inwardly from the bottom of lower member 28. Arms 32 and 34 can be made from a hardened steel. The distal ends of arms 32 and 34 each having a curved section 36 and 38, respectively.

Although it is not illustrated, one plate 12 can contain an aperture therein. The purpose of this aperture will be described hereinafter.

Upper member 16 and lower member 28 are joined in an overlapping fashion whereby bottom edge 18 acts as a shoulder as will be described hereinafter.

The other plate 14 includes an upper member 40 having a top edge 42 wherein the interior corner thereof contains a bevel 44. Upper member 40 further includes a bottom edge 46 and an interior surface 48. An ear 50 containing an aperture 52, projects inwardly from interior surface 48.

Other plate 14 further includes a lower member 54 having an interior surface 56, a generally rectangularly-shaped aperture 58 adjacent the top portion thereof. Further, lower member 54 includes a generally rectangularly-shaped projection 60 positioned above a pair of apertures 62 and 64 contained in lower member 54 near the bottom edge thereof.

The drawings further illustrate a water meter yoke having a shut-off valve 70 mounted thereto by a fitting. Shut-off valve 70 includes a pair of ears 72 and 74 each containing an aperture 76. A pipe 78 having a fitting on the end thereof and another pipe 80 connected directly to the shut-off valve 70 (by the fitting) are joined together. In a typical meter installation, the meter, which is positioned between pipes 78 and 80, is located in a hole in the ground. The hole is dimensioned so that the bottom of the yoke is adjacent to the bottom of the hole. It should be mentioned that the meter yoke assembly, and especially ears 72, 74 are made of a soft metal such as brass or copper. These elements are thus particularly susceptible to vandalism and breakage.

FIG. 1 illustrates a conventional padlock 90 which includes a hasp.

FIG. 1 illustrates the locking device 10 in an assembled condition. As depicted in FIG. 1, when the locking device 10 is assembled, the arms 32 and 34 pass through apertures 64 and 62, respectively. It is to be noted that the curved sections 36,38 of arms 32,34, respectively, pass completely through apertures 64 and 62 so as to make it difficult for someone to twist plates 12 and 14 relative to each other.

Ears 22 and 50 are positioned so that when the locking device 10 is assembled, these ears (22,50) overlap so that their respective apertures, aperture 24 (of ear 22) and aperture 52 (of ear 50), are in alignment. The hasp of the padlock 90 is passed through apertures 24 and 52 and the padlock 90 is locked. As a result, the plates 12 and 14 of the locking device 10 are locked together.

Ears 72, 74 of shut-off valve 70 pass through aperture 58. In the particular condition illustrated in the drawings, the shut-off valve is in an "off" condition.

As previously mentioned, the one plate 12 can contain an aperture positioned so as to be a counterpart to aperture 58. Thus, this aperture receives ears 72,74 if one wanted to position the shut-off valve in an "on" position, which is 180° from the "off" position.

It should be noted that the hasp of lock 90 is sandwiched between upper members 16 and 40 in such a fashion so that the entire hasp is within the volume defined between upper members 16 and 40. The gap between upper members 16 and 40 is relatively narrow and is not sufficiently wide to enable one to effectively have direct access to the hasp by a saw blade or the like. Consequently, the locking device 10 prevents effective direct access by a saw blade, bolt cutters or the like to the hasp so that the hasp cannot be sawed in two and the lock defeated.

It should also be noted that bevels 25 and 44 permit the corners of the padlock 90 to be positioned below the top edges 26 and 42 of the upper members 16 and 40, respectively. These bevels (25,44) permit the entire hasp of the lock 90 to be contained within the interior volume defined between the interior surfaces 20 and 48 of upper members 16 and 40, respectively.

When the locking device 10 assembled, bottom edges 18 and 46 of upper members 16 and 40, respectively, rest on either side of shut-off valve 70, and projections 72, 74 extend through generally rectangularly-shaped aperture 58.

When the locking device 10 is assembled, projection 60 rests against the fitting that connects the shut-off valve 70 to pipe 80. As a result, the abutment between the projection and fitting prevents someone from backing off the fitting and removing the shut-off valve.

Overall, the present invention is a novel locking device, typically made from a hard material, designed to protect a shut-off valve or the like, which is typically made from a soft material. The locking device protects the shut-off valve from disassembly from the meter yoke. The locking device, when assembled, cannot be twisted apart. When assembled, the locking device protects the lock (e.g. a padlock) that locks the locking device in the assembled condition.

While there have been described above the principles of this invention in connection with a specific device, it is to be clearly understood that this description is made only by way of example and not as a limitation to the scope of the invention.

What is claimed is:

1. A locking device for a valve to be used in conjunction with a lock having a hasp comprising:
   a pair of detachably connected corresponding plates each having a shoulder that when in the connected condition substantially prevents the movement of the flow valve, one of said plates including an arm passing through a corresponding aperture in the other one of said plates so as to restrict the relative twisting of said members, each of said plates having an ear containing an aperture through which the hasp of a lock passes whereby the entire hasp is sandwiched between said plates, each one of said plates includes an upper member joined to a lower member in an overlapping fashion to form the shoulder, and each one of said uppers members includes a top edge having an interior corner containing a bevel, said bevel accommodating the body of the lock so that the entire hasp is sandwiched between said upper members.

2. The locking device of claim 1, wherein said one plate further includes a second arm, said other plate includes second aperture, and said second arm passing through said second aperture.

3. A locking device for a valve to be used in conjunction with a lock having a hasp, comprising: a pair of detachably connected corresponding members that when in a connected condition engage the flow valve to substantially prevent its movement, said members including means for restraining relative twisting of the corresponding members, said members further including means for joining said members together with a lock wherein the hasp of the lock is sandwiched between said members, said joining means includes an ear projecting interiorly from each plate, said ears being adjacent one another when the locking device is in an assembled condition, and each of said ears containing an aperture wherein the apertures are aligned to permit the hasp to pass there through.

4. The locking device of claim 3 wherein said restraining means includes a pair of arms projecting from said one plate, said other plate containing a pair of apertures through which said arms pass when the locking device is in an assembled condition.

5. The locking device of claim 3 wherein each of said corresponding members includes an upper portion and a lower portion wherein when said members are in a connected condition, said upper portions are spaced apart a distance less that is less than the distance the lower portions are spaced apart.

6. The locking device of claim 5 wherein each one of said upper portions includes a top edge having an interior corner containing a bevel, said bevel accommodating the body of the lock so that the entire hasp is sandwiched between said upper portions.

7. A locking device for a valve comprising:
   one elongate plate having top and bottom ends, an ear near the top end and projecting interiorly from said one plate, an arm near the bottom end and projecting interiorly from said one plate, said one plate having a top edge with an interior corner containing a bevel;
   another elongate plate having top and bottom ends, an ear near the top end projecting interiorly from said other plate, an aperture contained in said other plate near the bottom end thereof, said other plate having a top edge with an interior corner containing a bevel;
   when the locking device is in an assembled condition, said ears overlap and said arm passes through said aperture;
   each of said ears containing an aperture; and
   a lock having a hasp, said hasp passing through the apertures in said ears, said bevels accommodating the body of the lock so that the entire hasp is contained within the volume defined by said plates.

* * * * *